United States Patent [19]

Deem et al.

[11] Patent Number: 4,638,900
[45] Date of Patent: Jan. 27, 1987

[54] FAN DRIVE MECHANISM

[75] Inventors: Brian C. Deem, Avon Lake; Jack A. Kemp, Elyria, both of Ohio

[73] Assignee: Allied Corporation, Morristown, N.J.

[21] Appl. No.: 745,152

[22] Filed: Jun. 17, 1985

[51] Int. Cl.⁴ .............................................. F16D 25/08
[52] U.S. Cl. ............................ 192/85 CA; 192/91 A; 192/109 R; 403/11
[58] Field of Search ........... 192/91 A, 85 CA, 109 R, 192/110 B; 403/11; 301/9 CN, 37 SC, 108 SC

[56] References Cited

U.S. PATENT DOCUMENTS

| | | | |
|---|---|---|---|
| 2,890,687 | 6/1959 | Richmond | 192/85 CA |
| 2,906,558 | 9/1959 | Forbush | 301/9 CN |
| 3,468,570 | 9/1969 | Mielke | 403/11 |
| 3,757,914 | 9/1973 | Elmer | 192/91 A X |
| 3,985,214 | 10/1976 | Hall et al. | 192/91 A |
| 4,425,993 | 1/1984 | Schilling | 192/91 A X |
| 4,445,606 | 5/1984 | Van Laningham | 403/11 X |
| 4,460,079 | 7/1984 | Hanks | 192/91 A X |
| 4,483,430 | 11/1984 | Carmichael et al. | 192/91 A |
| 4,541,516 | 9/1985 | Fenzel | 192/91 A X |

FOREIGN PATENT DOCUMENTS 571180 5/1924 France .............................. 301/9 CN Primary Examiner—Rodney H. Bonck
Assistant Examiner—Richard M. Lorence
Attorney, Agent, or Firm—Ken C. Decker; William N. Antonis

[57] ABSTRACT

Fan drive mechanism includes a fan plate rotatably mounted on a spindle by bearings having an outer race secured to the fan plate, an inner race mounted on the spindle, and ball bearings rotatably supporting the outer race on the inner race. A stop nut threaded on the spindle has a forward face engaging the inner race and a radially outwardly tapering conical surface tapering from the forward face. The conical surface catches the fan plate upon failure of the bearings and separation of the outer race from the inner race and controls the wobble of the fan plate while stopping its rotation, thereby preventing the fan plate from separating from the spindle.

12 Claims, 1 Drawing Figure

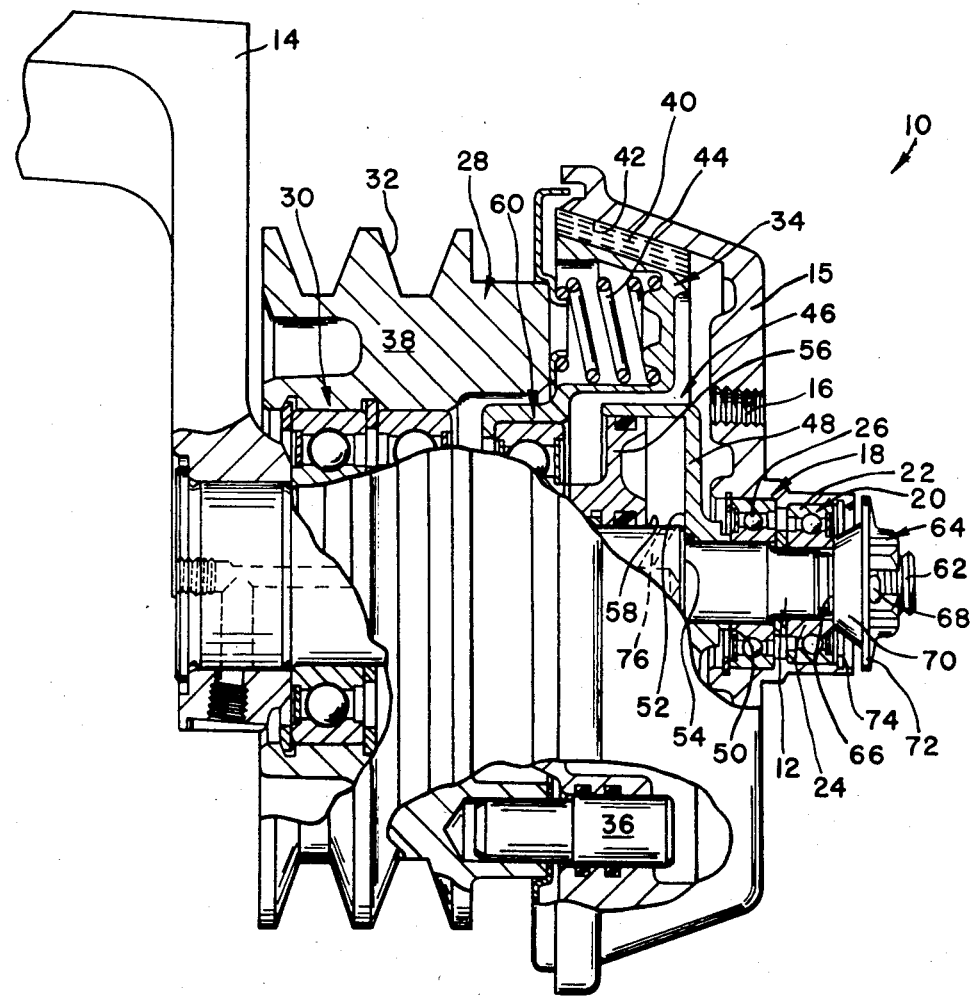

FAN DRIVE MECHANISM

This invention relates to a fan drive mechanism for operating the cooling fan of a vehicle engine.

Fan drive mechanisms for operating the cooling fan of a vehicle engine have been proposed before; for example, such a fan drive is disclosed in U.S. Pat. No. 4,483,430 issued Nov. 20, 1984 to Carmichael et al. The present invention prevents damage to the radiator and to other vehicle components in case of premature failure of the fan drive mechanism. Existing fan drive mechanisms mount a rotating fan plate adjacent the vehicle radiator. A clutching mechanism includes springs which urge a pressure plate into driving engagement with the fan plate when the clutch is engaged. When the bearings supporting the fan plate fail, the springs force the fan plate, which continues to rotate, into the vehicle radiator, causing damage to both the fan and the radiator. The vehicle operator has no warning of this condition until the engine overheats due to loss of radiator coolant. Accordingly, what is initially a relatively inexpensive repair of the fan drive mechanism turns into an expensive major repair of the fan drive, fan and radiator. Furthermore, automatic shutdown systems to prevent engine overheating prevent the vehicle from being moved with a damaged radiator, but if the fan drive mechanism alone fails, the vehicle may be moved a short distance by depending upon ram air cooling.

The present invention captures the fan plate in case of bearing failure and retains it on its supporting spindle while stopping rotation of the fan plate. Accordingly, the driver is warned of the failed fan drive upon overheating of the radiator and the resulting indication to the vehicle operator. Damage to the fan and the radiator is thereby prevented.

These and other advantages of the invention will be apparent from the following detailed description, with reference to the accompanying drawing, the sole FIGURE of which is a partial longitudinal cross sectional view of a fan drive mechanism made pursuant to the teachings of the present invention.

Referring now to the drawing, a fan drive mechanism generally indicated by the numeral 10 includes a spindle 12 which is mounted to a stationary portion of the vehicle by a bracket 14. The spindle 12 is generally mounted in front of the vehicle engine and between the engine and the vehicle radiator so that operation of the cooling fan draws air through the radiator in the conventional manner. The engine cooling fan (not shown) is bolted to a fan plate 15 by bolts received in openings 16 in the fan plate 15. The fan plate 15 is mounted on the spindle 12 by bearings 18, 20. Each of the bearings 18, 20 includes an outer race 22 which is fixed to the fan plate 15, an inner race 24, which is mounted on the spindle 12, and ball bearings 26 interposed between the races 22, 24.

A driving member generally indicated by the numeral 28 is rotatably mounted on the spindle 12 by bearings generally indicated by the numeral 30. The driving member 28 is provided with the conventional V-belt grooves 32 for connection with the vehicle engine so that the driving member 28 may be rotated thereby. The driving member 28 further includes a portion movable axially or a pressure plate generally indicated by the numeral 34 which is supported on circumferentially spaced pins 36 on the portion 38 of the driving member 28 which carries the V-belt grooves 32.

The pressure plate 34 may also be considered to be a means engagable and disengagable from the fan plate. The pressure plate 34 carries friction material 40 for engagement with the conical engagement surface 42 defined on the fan plate 15 to thereby form a driving connection between the driving member 28 and the fan plate 15 when the drive mechanism effects a driving connection with the vehicle fan. Circumferentially spaced springs 44 between the portion 38 of the driving member 28 and the pressure plate 34 yieldably urge the pressure plate 34 into driving engagement with the fan plate 15. However, when a sensor (not shown) senses that the cooling effect of the fan is not necessary, the driving connection with the fan plate 15 is broken by moving the pressure plate 34 out of driving engagement with the engagement surface 42 by operation of a fluid pressure responsive means or fluid motor generally indicated by the numeral 46. The fluid motor 46 and pressure plate 34 comprise a disengagable drive means.

Fluid motor 46 includes a circumferentially extending cylinder assembly generally indicated by the numeral 48. Cylinder assembly 48 is mounted on the spindle 12 and includes a face portion 50 which is engaged by the inner race 24 of the bearing 18 and an opposite face 52 which is engaged by a shoulder 54 on the spindle 12, thereby locking the cylinder assembly 48 on the spindle 12. A piston assembly 56 is slidably mounted on larger diameter portion 58 of the spindle 12 and is slidingly received within the cylinder assembly 48. The pressure plate 34 is rotatably supported on the piston 56 by a bearing generally indicated by the numeral 60.

The spindle 12 terminates in a threaded end 62. A stop nut generally indicated by the numeral 64 is threadedly received on the threaded end 62 and includes a circumferentially extending forward face 66 which abuts the inner race 24 of the bearing 20. The nut 64 is retained by a cotter pin 68 received through an opening in nut 64 and hole in shaft 12 end. A conical surface generally indicated by the numeral 70 tapers radially outwardly from the face 66. The conical surface 70 terminates in a radially projecting flange 72 that cooperates with axially extending portion 74 of fan plate 15 to at least partially protect the bearings 18, 20 from environmental contaminants.

In operation, springs 44 normally yieldably urge the pressure plate 34 into driving engagement with the fan plate 15 so that rotation of the driven member 28 by the vehicle engine is transmitted to the fan plate 15 to thereby rotate the engine cooling fan. When the aforementioned sensor senses that the cooling effect of the fan is no longer necessary, the sensor communicates air pressure from the vehicle air brake system through the passages 76 within the spindle 12 into the chamber defined between the cylinder 48 and the piston 56. Fluid pressure in the chamber urges the piston 56 to the left, viewing the FIGURE, thereby urging pressure plate 34 away from driving engagement with the fan plate 15, to break the driving connection therebetween to permit the fan plate 15 to freewheel on the bearings 18, 20, until the aforementioned pressure sensor senses that the cooling effect of the fan is again necessary, whereupon the chamber between the piston 56 and cylinder assembly 48 is vented to permit the springs 44 to again urge the pressure plate 34 into driving engagement with the fan plate 15.

The bearings 18, 20 which rotatably support the fan plate 15 may ultimately fail. When this occurs, springs 44 tend to drive the pressure plate 34 and fan plate 15 to the right, viewing the FIGURE. In prior art devices, the fan plate 15 was driven off the end of the spindle 12, while the fan plate 15 continued to rotate. However, instead of the fan plate 15 being free to move off the end of the spindle 12 and engage the radiator, the conical surface 70 catches the balls 26 and outer race 22 of the bearing 20. The conical surface 70 tapers such that the force transmitting balls of the bearing 22 are caught at some point on the axial length of the conical surface 70. As the bearing parts jam into the conical surface 70, the conical surface 70 frictionally engages the bearing parts to stop the fan plate 15 from rotating, while the tapered surface 70 controls the wobble of the plate 15 as it comes to the stop, thereby preventing it from deflecting into the radiator.

It should be noted that the axial length of the surface 70 is sufficiently long that it limits movement of the plate 15 along the axis of the spindle 12 during failure of the bearings to an incremental amount longer than the maximum stroke of the piston 56. The maximum stroke of the piston 56, of course, is also the maximum axial movement of the pressure plate 34. Accordingly, because an incremental additional axial movement of the plate 15 is permitted upon failure of the bearings, it can be assured that the plate 15 will be permitted to move out of driving engagement with the pressure plate 34. Accordingly, the braking effect of the friction between the conical surface 70 and the bearing parts is able to stop rotation of the fan plate 15.

We claim:

1. Fan drive mechanism comprising a spindle having an axis, a fan plate, bearing means for rotatably mounting said fan plate on said spindle, said fan plate being displacable axially along said spindle upon failure of the bearing means, said bearing means including an inner race mounted on said spindle, an outer race mounted on said fan plate, and means for permitting rotation between said races, and stop means having a surface tapering radially outwardly with respect to said axis of the spindle to define a conical surface for engagement by said means permitting rotation upon separation of the latter from said inner race to thereby limit the axial displacement of the fan plate with respect to said spindle upon failure of the bearing means, a driving member rotatably mounted on said spindle, said driving member including a portion movable axially along said spindle for a predetermined maximum axial distance for driving engagement with said fan plate to form a driving connection between said driving member and said fan plate, said portion moving away from said fan plate to break said driving connection, and fluid pressure responsive means for moving said portion along said spindle, the axial length of said conical surface along the axis of said spindle being sufficiently long to permit movement of said fan plate after failure of said bearing means a distance at least incrementally longer than the maximum axial distance of movement of said portion on said spindle.

2. Fan drive mechanism as claimed in claim 1, wherein said means permitting rotation are ball bearings.

3. Fan drive mechanism as claimed in claim 1, wherein said stop means is a nut threadedly mounted on said spindle.

4. Fan drive mechanism as claimed in claim 3, wherein said spindle has an end upon which the nut is mounted and said nut has a forward face for engagement with said inner race and said conical surface tapers from said forward face toward the end of said spindle when said nut is installed thereon.

5. Fan drive mechanism as claimed in claim 4, wherein said conical surface tapers from said forward face to a flange projecting radially with respect to said spindle to cooperate with a portion of said fan plate extending axially along said spindle to protect said bearing means from environmental contaminants. movement of said portion on said spindle.

6. Fan drive mechanism as claimed in claim 1, wherein said fluid pressure responsive means includes a cylinder assembly mounted on said spindle, said cylinder slidably receiving a fluid pressure responsive piston assembly, said piston assembly being slidably mounted on said spindle, and means for communicating fluid pressure into said cylinder.

7. Fan drive mechanism as claimed in claim 6, wherein said cylinder assembly includes a face portion engaging said inner race.

8. Fan drive mechanism comprising a spindle having an axis, a fan plate, bearing means for rotatably mounting said fan plate on said spindle, said fan plate being displacable axially along said spindle upon failure of the bearing means, said bearing means including an inner race mounted on said spindle, an outer race mounted on said fan plate, and means for permitting rotation between said races, and stop means having a surface tapering radially outwardly with respect to said axis of the spindle to define a conical surface for engagement by said means permitting rotation upon separation of the latter from said inner race to thereby limit the axial displacement of the fan plate with respect to said spindle upon failure of the bearing means, and disengageable drive means rotatably mounted on said spindle and including means engageable and disengageable from said fan plate for effecting and breaking a driving connection between said drive means and said fan plate, said drive means including a fluid pressure responsive piston slidably mounted for movement on said spindle for a maximum stroke for effecting engagement and disengagement of said drive means, the axial length of said conical surface along the axis of said spindle being sufficiently long to permit movement of said fan plate after failure of said bearing means a distance at least incrementally longer than the maximum stroke of said piston.

9. Fan drive mechanism as claimed in claim 8, wherein one end of said conical surface terminates in a flange projecting radially with respect to said spindle to cooperate with a portion of said fan plate extending axially along said spindle to protect said bearing means from environmental contaminants.

10. Fan drive means as claimed in claim 9, wherein the other end of said conical surface terminates in a forward face for engagement with said bearing race.

11. Fan drive mechanism comprising a spindle having an axis, a fan plate, bearing means for rotatably mounting said fan plate for rotation around said spindle, said fan plate being displacable axially along said spindle upon failure of said bearing means, said bearing means including an inner race mounted on said spindle, an outer race mounted on said fan plate, and means for permitting rotation between said races, and stop means having a surface tapering radially outwardly with respect to said axis of the spindle to define a continous, uninterrupted substantially smooth conical surface for frictional engagement by said means permitting rotation upon separation of the latter from said inner race to permit said frictional engagement to stop rotation of said fan plate as the conical surface controls wobble of said fan plate as rotation of the latter is stopped and to thereby limit the axial displacement of the fan plate with respect to said spindle upon failure of the bearing means.

12. Fan drive mechanism as claimed in claim 11, further including a driving member rotatably mounted on said spindle, said driving member including a portion movable axially along said spindle for a predetermined maximum axial distance for driving engagement with said fan plate to form a driving connection between said driving member and said fan plate, said portion moving away from said fan plate to break said driving connection, and fluid pressure responsive means for moving said portion along said spindle, the axial length of said conical surface along the axis of said spindle being sufficiently long to permit movement of said fan plate after failure of said bearing means a distance at least incrementally longer than the maximum axial distance of movement of said portion on said spindle.

* * * * *